United States Patent
Mei et al.

(10) Patent No.: US 12,323,217 B2
(45) Date of Patent: Jun. 3, 2025

(54) METHODS, DEVICES AND SYSTEMS FOR DETERMINING SFN USING QCL INFORMATION

(71) Applicant: ZTE CORPORATION, Guangdong (CN)

(72) Inventors: Meng Mei, Shenzhen (CN); Chuangxin Jiang, Shenzhen (CN); Zhaohua Lu, Shenzhen (CN); Shujuan Zhang, Shenzhen (CN); Yu Pan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/206,946

(22) Filed: Jun. 7, 2023

(65) Prior Publication Data
US 2023/0396308 A1    Dec. 7, 2023

Related U.S. Application Data

(63) Continuation of application No. PCT/CN2021/085336, filed on Apr. 2, 2021.

(51) Int. Cl.
*H04B 7/06* (2006.01)
*H04B 7/01* (2006.01)
*H04W 72/232* (2023.01)

(52) U.S. Cl.
CPC ........... *H04B 7/06968* (2023.05); *H04B 7/01* (2013.01); *H04B 7/0626* (2013.01); *H04W 72/232* (2023.01)

(58) Field of Classification Search
CPC .... H04B 7/06968; H04B 7/01; H04B 7/0626; H04W 72/232; H04L 5/0053; H04L 5/0023
See application file for complete search history.

(56) References Cited

U.S. PATENT DOCUMENTS

| | | | |
|---|---|---|---|
| 2019/0296868 A1* | 9/2019 | Zhang | H04B 17/364 |
| 2020/0077369 A1 | 3/2020 | Zhang et al. | |
| 2020/0163059 A1* | 5/2020 | Zhang | H04L 25/0226 |
| 2021/0044403 A1* | 2/2021 | Zhang | H04L 5/0035 |

FOREIGN PATENT DOCUMENTS

| | | |
|---|---|---|
| CN | 111769918 A | 10/2020 |
| CN | 111801972 A | 10/2020 |

(Continued)

OTHER PUBLICATIONS

ZTE, "Discussion on Multi-TRP HST enhancements", 3GPP TSG RAN WG1 meeitng #104-e, R1-20100289, Feb. 5, 2021.*

(Continued)

*Primary Examiner* — Sung S Ahn
(74) *Attorney, Agent, or Firm* — Foley & Lardner LLP

(57) ABSTRACT

A system and method for determining SFN using QCL information is disclosed. In one aspect, a method receiving, by a wireless communication device, a first set of quasi-co-location (QCL) information; receiving, by the wireless communication device, a transmission; and applying, by the wireless communication device, a second set of QCL information based on the first set of QCL information, wherein the second set of QCL information is different from the first set of QCL information.

19 Claims, 10 Drawing Sheets

(56) References Cited

FOREIGN PATENT DOCUMENTS

| WO | WO-2020/019216 A1 | 1/2020 |
|----|-------------------|--------|
| WO | WO-2020/088550 A1 | 5/2020 |

OTHER PUBLICATIONS

International Search Report and Written Opinion for PCT Appl. No. PCT/CN2021/085336, mailed Jan. 5, 2022 (7 pages).
CMCC, "Enhancements on HST-SFN deployment", 3GPP TSG RAN WG1 #103-e, R1-2008004, Nov. 13, 2020, e-Meeting (10 pages).
Extended European Search Report for EP Appl. No. 21934086.6, dated Apr. 3, 2024 (9 pages).
Vivo, "Further discussion and evaluation on HST-SFN schemes", 3GPP TSG RAN WG1 #103-e, R1-2007648, Nov. 13, 2020, e-Meeting (11 pages).
ZTE, "Discussion on Multi-TRP HST enhancements", 3GPP TSG RAN WG1 meeting #104-e, R1-2100289, Feb. 5, 2021, e-Meeting (7 pages).
CMCC, "Enhancements on HST-SFN deployment," 3GPP TSG RAN WG1 #104-e, R1-2101036, e-Meeting, Jan. 25, 2021 (10 pages).
Futurewei, "Enhancement to support HST-SFN deployment scenario," 3GPP TSG RAN WG1 Meeting #104-e, R1-2100041, e-Meeting, Jan. 25, 2021 (8 pages).
Lenovo, et al., "Enhancements for HST-SFN deployment," 3GPP TSG RAN WG1 #104-e, R1-2100988, e-Meeting, Jan. 25, 2021 (10 pages).
LG Electronics, "Enhancements on HST-SFN deployment," 3GPP TSG RAN WG1 #104-e, R1-2100622, e-Meeting, Jan. 25, 2021 (7 pages).
Moderator (Intel Corporation), "Summary#4 of AI: 8.1.2.4 Enhancements on HST-SFN deployment," 3GPP TSG RAN WG1 #104-e, R1-2102214, e-Meeting, Jan. 25, 2021 (58 pages).
OPPO, "Enhancements on HST-SFN deployment," 3GPP TSG RAN WG1 #104e, R1-2100122, e-Meeting, Jan. 25, 2021 (5 pages).
Qualcomm Incorporated, "Enhancements on HST-SFN deployment," 3GPP TSG-RAN WG1 Meeting #104-e, R1-2101450, e-Meeting, Jan. 15, 2021 (29 pages).
Spreadtrum Communications, "Discussion on enhancements on HST-SFN deployment," 3GPP TSG RAN WG1 #104-e, R1-2100787, Jan. 25, 2021 (4 pages).

* cited by examiner

METHODS, DEVICES AND SYSTEMS FOR DETERMINING SFN USING QCL INFORMATION

CROSS-REFERENCE TO RELATED APPLICATION

This application claims the benefit of priority under 35 U.S.C. § 120 as a continuation of International Patent Application No. PCT/CN2021/085336, filed on Apr. 2, 2021, the disclosure of which is incorporated herein by reference in its entirety.

TECHNICAL FIELD

The disclosure relates generally to wireless communications and, more particularly, to systems and methods for determining SFN using QCL information.

BACKGROUND

In a single frequency network (SFN) scenario, two transmission reception points (TRPs) transmit same information to one user equipment (UE), but in a high speed train (HST)-SFN scenario, the UE moves from one TRP to the other TRP causing Doppler effects such that a first Doppler effect with respect to one TRP may be opposite of a second Doppler effect with respect to other TRP.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one aspect, a method includes receiving, by a wireless communication device, a first set of quasi-co-location (QCL) information; receiving, by the wireless communication device, a transmission; and applying, by the wireless communication device, a second set of QCL information based on the first set of QCL information, wherein the second set of QCL information is different from the first set of QCL information.

In some embodiments, the first set of QCL information includes QCL type A information of a first transmission configuration indicator (TCI) state, and QCL type A information of a second TCI state, and the second set of QCL information includes partial parameters of QCL type A of the first TCI state, and partial parameters of QCL type A of the second TCI state.

In some embodiments, the second set of QCL information includes parameters of {delay spread, average delay} of the first TCI state, and parameters of {Doppler spread, Doppler shift} of the second TCI state.

In some embodiments, the method includes determining, by the wireless communication device, according to at least one of: an antenna port field or a demodulation reference signal (DMRS) code division multiplexing (CDM) group index of downlink control information (DCI), that the first TCI state of the second set of QCL information includes parameters {delay spread, average delay}, and that the second TCI state of the second set of QCL information include parameters {Doppler shift, Doppler spread}.

In some embodiments, the transmission includes a physical downlink shared channel (PDSCH) transmission, an aperiodic channel state information reference signal (CSI-RS) transmission, or a physical downlink control channel (PDCCH).

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
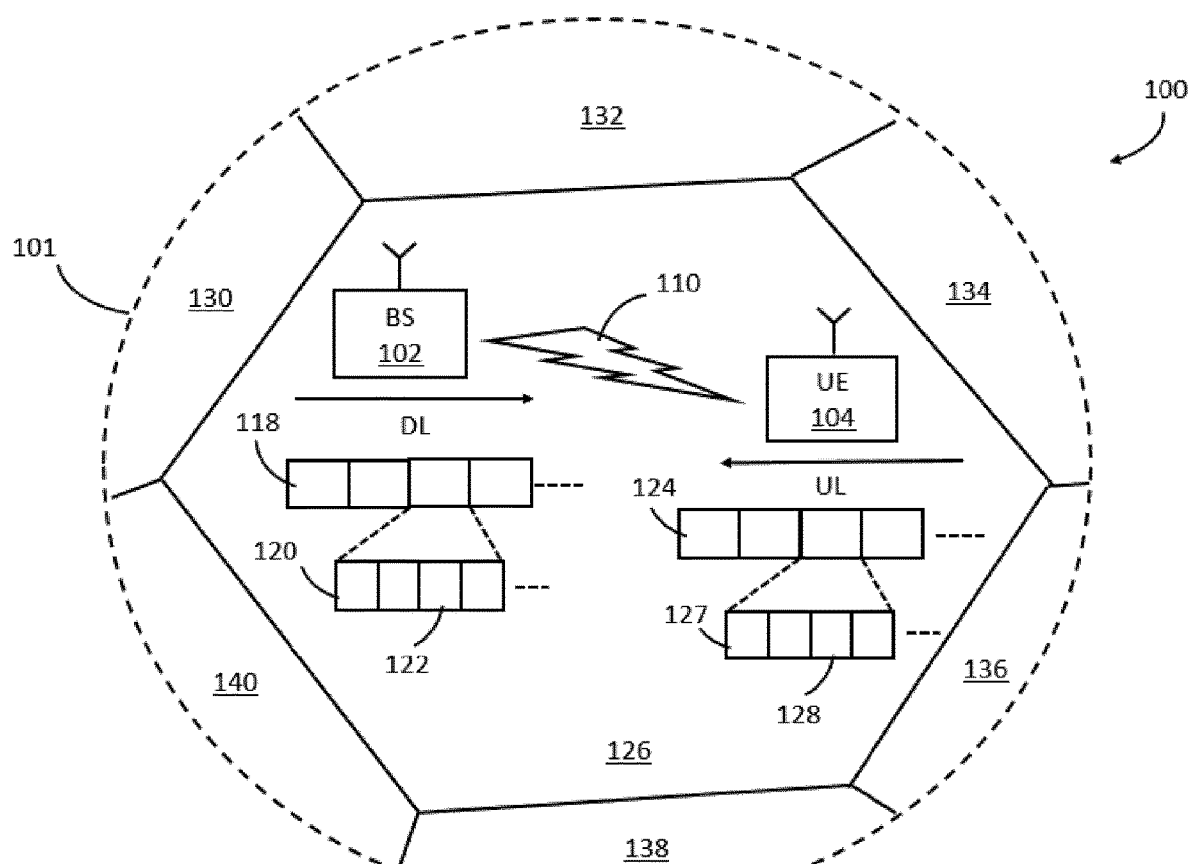
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
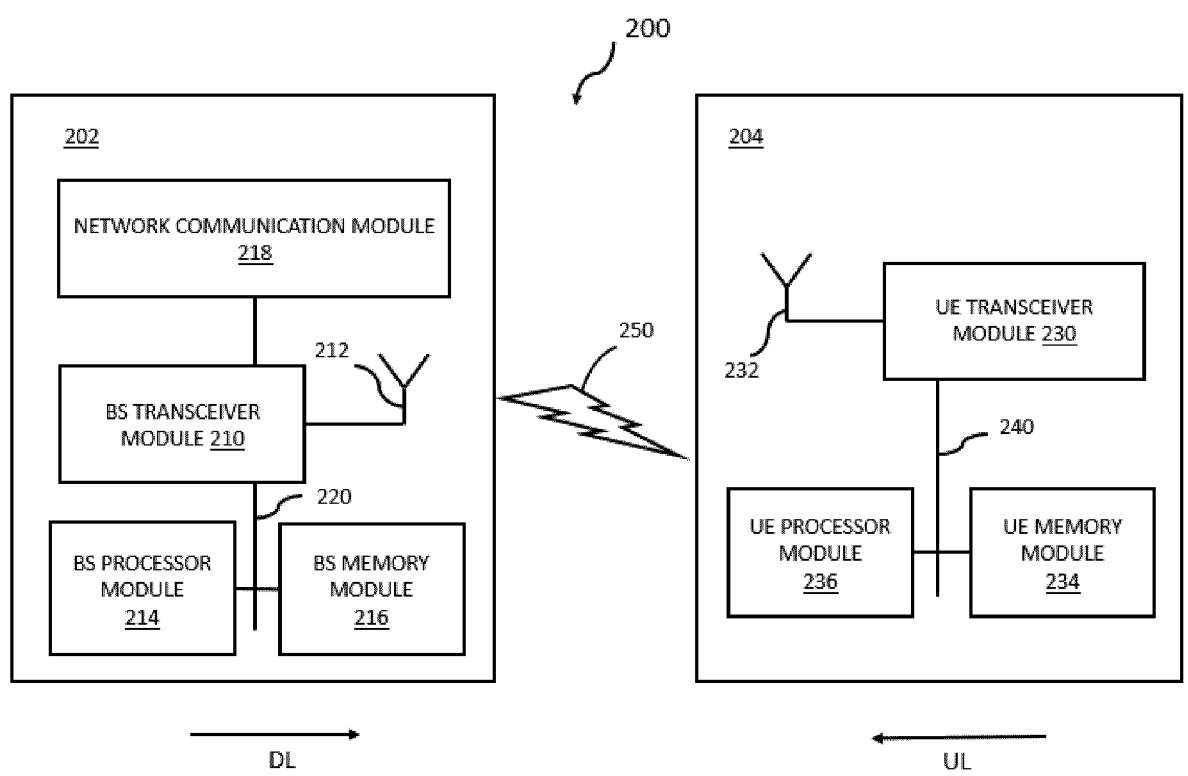
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Determining SFN Using QCL Information

In a single frequency network (SFN) scenario, two transmission reception points (TRPs, e.g., terrestrial networks, towers, antenna arrays, etc.) can transmit same information to one UE (e.g., a user equipment, the UE 104, the UE 204, a mobile device, a wireless communication device, a terminal, etc.), but in a high speed train (HST)-SFN scenario, the UE moves from one TRP to the other TRP such that a first Doppler effect caused by high speed with respect to one TRP may be opposite of a second Doppler effect caused by the high speed with respect to other TRP. The two TRPs transmitted the same information to one UE, and a tracking reference signal (TRS) can be configured to estimate a frequency offset (e.g., Doppler) caused by the high speed. In some embodiments, transmission configuration information (TCI) states that are activated by medium access control (MAC) control element (CE) and indicated by downlink control information (DCI) can contain parameters such as a Doppler shift and a Doppler spread. In some embodiments, the TCI states (sometimes referred to as beam states) can be configured for the TRS and physical downlink share channel (PDSCH). In some embodiments, the quasi co-location (QCL) information configured in the TCI states can be indicated to the UE. Some embodiments of how the UE uses the QCL information contained in the two TCI states configured for the two TRPs are disclosed herein.

In the high speed train-SFN scenario, the Doppler of one TRP may be opposite of, substantially opposite of, or otherwise different from, the Doppler the other TRP because the UE is moving away from the one TRP (e.g., TRP0) and towards the other TRP (e.g., TRP1). That is, in some embodiments, the movement of the UE causes an opposite frequency offset on the same PDSCH from different TRPs. Thus, in some embodiments, what is needed is a mechanism to compensate the frequency offset from the two TRPs.

The TRS can be configured to estimate the frequency offset caused by the high speed. One TCI state can be configured with one TRS resource from one TRP. However, if only one TRS is configured for the SFN PDSCH from two TRPs, the different or opposite frequency offset will not be estimated correctly. Thus, configuring one TRS for each TRP, using pre-compensation, or using a combination thereof may implement PDSCH frequency offset compensation in the high speed scenario of SFN transmission.

If pre-compensation is supported in the HST-SFN scenario, the downlink carrier frequency (e.g., which contains the frequency offset) can be indicated to UE for modulating the uplink (UL) reference signal (RS) or physical uplink shared channel (PUSCH). When the TRPs received the uplink RS, the TRP can get/acquire/receive/obtain the frequency offset in the downlink transmission and use the estimated frequency offset as the pre-compensation frequency offset value. Thus, the related Doppler parameters can be indicated to the UE by activating or indicating the TCI states to the UE.

Disclosed herein are a number of QCL types, including, but not limited to:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}
'QCL-TypeE': a subset of the parameters in one or more of the QCL-TypeA, the QCL-TypeB, or the QCL-TypeC.

In some embodiments, the TCI states that are activated by MAC CE and/or indicated by DCI can contain the parameters such as Doppler shift and Doppler spread, and the TCI states can be configured for the TRS and PDSCH. Thus, in some embodiments, the UE can get the Doppler related parameters according to the TCI states.

Disclosed herein are some embodiments in which the UE acquires two TCI states (e.g., two groups of TCI states). In some embodiments, the UE acquires some of the configured QCL information from one TCI state (e.g., one group of TCI states, a first TCI state, a first group of TCI states) and acquires some of the configured QCL information from the other TCI state (e.g., the other group of TCI states, a second TCI state, a second group of TCI states). In some embodiments, the first TCI state contains the QCL information of {delay spread, average delay}, and the second TCI state contains the QCL information of {Doppler shift, Doppler spread}.

In some embodiments, an antenna ports field or a demodulation reference signal (DMRS) code division multiplexing (CDM) group index can be used to indicate an association of the indicated or activated TCI states with two TCI states. A combined QCL information from the two indicated and/or activated TCI states can be indicated to the PDSCH or an aperiodic (AP) channel state indicator (CSI)-RS for instance.

In some embodiments, the combined QCL information contains QCL parameters of {Doppler shift, Doppler spread} from one indicated or activated TCI state, e.g., a TCI state configured with the QCL type A, and the QCL parameters of {delay spread, average delay} from the other indicated or activated TCI state, e.g., a TCI state configured with the QCL type E. If (e.g., only) one TCI state is indicated to the PDSCH, the combined QCL information can be indicated to the PDSCH according to the indication of TCI states configured with the QCL type E. Once the MAC CE activates one TCI state with the QCL type E and the DCI indicates the one TCI state for the PDSCH, the QCL type E can be recovered as the QCL type A, the QCL type B, or the QCL type C.

In some embodiments, only the one TCI state configured with QCL type E is indicated for the PDSCH or activated for a physical downlink control channel (PDCCH) for instance. In some embodiments, a default TCI state of a single TRP with the SFN-based PDCCH contains at least one QCL type E, and the TCI states indicated for PDSCH are configured as QCL type E. In some embodiments, a default TCI state of the aperiodic CSI-RS with the SFN-based PDSCH contains at least one QCL type E, and the QCL type E is configured in the first TCI state of the PDSCH.

In some embodiments, a default TCI state of a single DCI-based multiple TRP (multi-TRP, MTRP, e.g., one codepoint contains two TCI states) with the SFN-based PDCCH contains at least one QCL type E, and the two DMRS CDM groups are indicated for the PDSCH. In some embodiments, once one codepoint indicated to the UE contains two TCI states and one of the TCI states is configured as the QCL type E, one or more QCL parameters of the default TCI state can be ignored. In some embodiments, the TCI state is configured with the QCL type A as the default TCI state of aperiodic CSI-RS.

In some embodiments, all the configured or activated TCI states can be divided to two groups, and each group associated with one CORESETPoolIndex. In some embodiments, each group is associated with one cell-specific reference symbol (CRS) pattern for PDSCH rate matching, and the indicated TCI state can indicate the CRS pattern. In some embodiments, each group is associated with one scrambling identifier (ID) of PDSCH, and the indicated TCI state can indicate the PDSCH scrambling ID.

In some embodiments, the UE receives the PDCCH, the PDSCH, or the AP CSI-RS from the TRP. For each transmission, the UE can receive a first set of QCL information/assumptions/parameters from the activated or indicated TCI state. However, in some scenarios, some parameters from the first set of QCL information may be included in (e.g., used in, used as) the second set of QCL information, while other parameters from the first set of QCL information may not be included in the second set of QCL information. For example, radio resource control (RRC) signaling can configure the PDSCH transmission as an SFN and pre-compensation is supported. Thus, the Doppler shift from the first TCI state may not be used.

In some embodiments, the UE acquires two TCI states, wherein some of the configured QCL information is acquired from one TCI state and some other of the configured QCL information is acquired from the other TCI state. The first TCI state can contain the QCL information of {delay spread, average delay}, and the second TCI state can contain the QCL information of {Doppler shift, Doppler spread}. The first TCI state can contain the QCL information of {delay spread}, and the second set of TCI state can contain the QCL information of {Doppler shift, Doppler spread, average delay}.

The Antenna ports field or the DMRS CDM group index can be used to indicate the association of the indicated or activated TCI states with the two TCI states. In some scenarios, multiple TRPs transmit the PDSCH to one UE, e.g., for the PDSCH in the SFN manner. In the SFN-based PDSCH, two or more TRPs can transmit the same PDSCH to the UE from different places, so if the UE moves at a very high speed, from one TRP to another TRP, a first Doppler with reference to one TRP can be different from a second Doppler with reference to another TRP. If the UE is in the middle of the two TRPs, the first Doppler shift with reference to one TRP can be the opposite from the second Doppler shift with reference to another TRP. Thus, the UE may determine/make/calculate/estimate a wrong Doppler shift estimation because the same PDSCH is transmitted from different TRPs and may be combined by the UE. In order to reduce the Doppler shift impact for the SFN-based PDSCH, the Doppler shift may come from one TRP. In some embodiments, the Doppler shift is contained in the QCL information in the TCI states configured or activated or indicated to PDSCH and two TCI states are supported to indicate to the PDSCH. Thus, in some embodiments, the Doppler shift in the QCL information from one TCI state configured or indicated to the reference signal is the reference information and the Doppler related information cannot be configured or ignored in the case of Doppler related information is configured.

In the SFN-based PDSCH transmission, two TRS resources can be configured for two TRPs. Thus, two TCI states can be configured, and one of the TCI states may not contain the Doppler related information, or, if the Doppler related information is configured in the TCI states, the Doppler information may be ignored.

Based on the delay related information being used in the SFN manner, the delay related information can be obtained from the two TRPs as a combined manner, and the delay information can be configured in one TCI state and indicated to the UE. Thus, the delay related parameter can be configured or activated or indicated in one TCI state.

Figure 3:
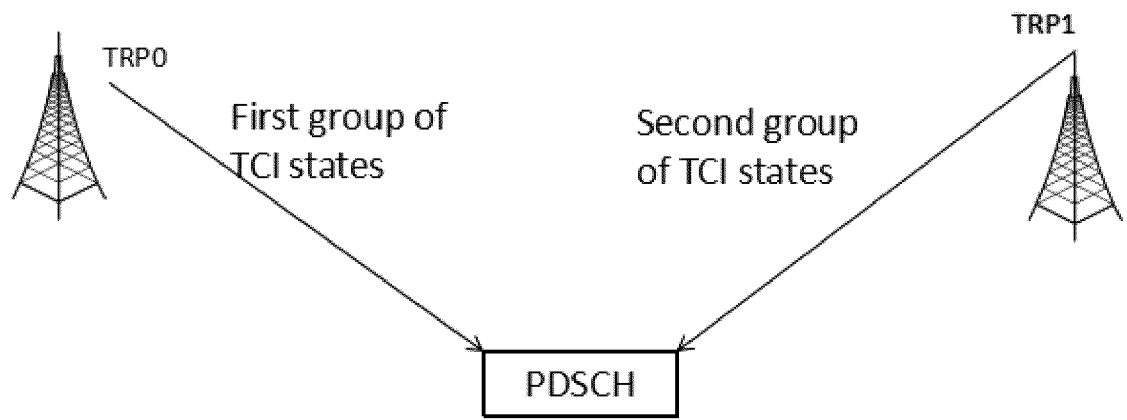
FIG. 3 illustrates an example block diagram of multi-TRP transmission, in accordance with some embodiments of the present disclosure.

FIG. 3 illustrates an example block diagram of multi-TRP transmission, in accordance with some embodiments of the present disclosure. In some embodiments, for two TCI states configured for multi-TRP transmission, if the higher layer parameter (e.g., RRC) configures the transmission as SFN or pre-compensation, one TCI state contains the Doppler related information, and the other TCI state contains the delay related information. In some embodiments, the Doppler related information is ignored for one TCI state and the delay related information is ignored for the other TCI state. In some embodiments, the two TCI states are configured, activated, and/or indicated to one UE, a higher layer parameter can be used to configure pre-compensation and/or SFN, and the first TCI state is configured for one TRP and the other TCI state is configured for the other TRP, as shown in FIG. 3.

Figure 4:
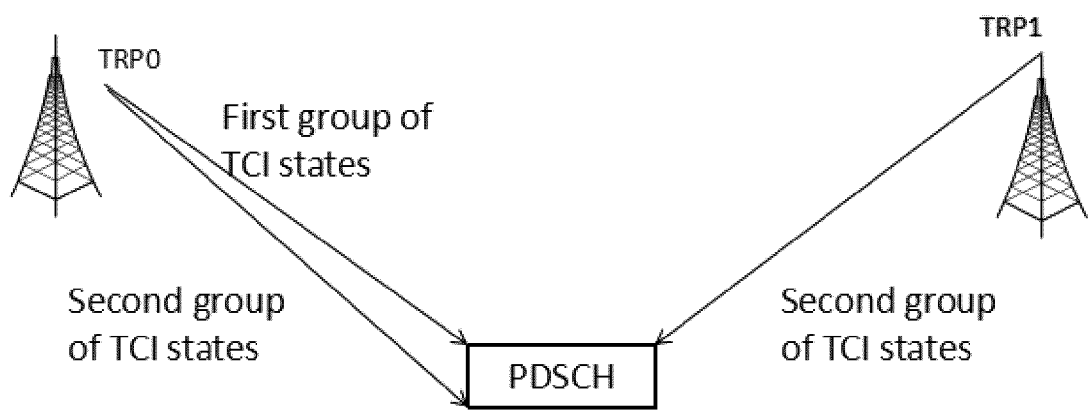
FIG. 4 illustrates another example block diagram of multi-TRP transmission, in accordance with some embodiments of the present disclosure.

FIG. 4 illustrates another example block diagram of multi-TRP transmission, in accordance with some embodiments of the present disclosure. In some embodiments, the two TCI states are not associated with the two TRPs, respectively, and multiple TCI states can contain the Doppler related and delay related information, as shown in FIG. 4.

Although FIGS. 3-4 illustrate multi-TRP transmission with respect to the SFN-based PDSCH, multi-TRP transmission with respect the SFN-based PDCCH or other channels/transmission is within the scope of the present disclosure.

Thus, in some embodiments, two TCI states can contain different or partially different QCL information, and the UE knows/identifies/determines/detects which TCI state contains the Doppler related parameters and which TCI state contains the delay related parameters. In some embodiments, based on the high speed scenario in which the UE moves with a very high speed, up to two layers can be configured or indicated. In some embodiments, in the DCI, the antenna port field is used to indicate the scheduling DMRS ports, and different DMRS ports belong to different DMRS CDM groups. Thus, the DMRS port field or the DMRS CDM group index can be used to indicate (e.g., to the UE) which TCI state contains the Doppler related parameter and which TCI state contains the delay related parameter.

For example, if the DMRS port is indicated as CDM group 0, (e.g., the UE determines that) the first TCI state contains the Doppler related parameters and the second TCI state contains the delay related parameters, and if the DMRS port is indicated as CDM group 1, the first TCI state contains the delay related parameters and the second TCI state contains the Doppler related parameters.

The antenna port field in DCI can indicate the DMRS port and can be used to indicate the QCL information of the two TCI states. For example, some entries of the antenna port field related to CDM group 0 can indicate that the first TCI state contains the Doppler related parameters and that the second TCI state contains the delay related parameters, and some entries of the antenna port field related to CDM group 1 can indicate that the first TCI contains the Delay related parameters and that the second TCI state contains the Doppler related parameters. For example, as shown in Table 1.1, DMRS ports 0 and 1 are configured or indicated as CDM group 0, and DMRS ports 2 and 3 are configured or indicated as CDM group 1. A shown in Table 1.1, for the entries/values 0 to 3, the DMRS port is indicated as port 0 or port 1 of CDM group 0, and the entries/values 4 and 5 indicate the DMRS port 2 or 3 of CDM group 1. Accordingly, in some embodiments, different entries of the antenna port field indicate different DMRS port of different CDM groups. Thus, the antenna port field or the DMRS CDM group index can be used to indicate the QCL information with Doppler or delay related parameters of the two TCI states.

TABLE 1.1

Antenna port(s), transform precoder is disabled, dmrs-Type = 1, maxLength = 1, rank = 1

| Value | Number of DMRS CDM group(s) without data | DMRS port(s) |
|---|---|---|
| 0 | 1 | 0 |
| 1 | 1 | 1 |
| 2 | 2 | 0 |
| 3 | 2 | 1 |
| 4 | 2 | 2 |
| 5 | 2 | 3 |
| 6-7 | Reserved | Reserved |

Once the MAC CE activates one TCI state, or one codepoint containing one TCI state, with the QCL type E, and the DCI indicates the one TCI state for the PDSCH, the QCL type E can be treated as (e.g., converted to, recovered as, substituted with) QCL type A or QCL type B or QCL type C.

For the PDSCH transmission, the QCL information can be configured or activated or indicated to UE. For different scenarios, different QCL types can be configured. For a frequency range 1 (FR1), the QCL type A, the QCL type B, and the QCL type C are supported to be configured in the TCI states, but there may be more QCL types that can be supported. For example, another QCL type E may indicate the delay related parameters of PDSCH, but the QCL type E may be indicated to the MTRP PDSCH transmission, e.g., SFN. The UE can get other QCL information from another TCI state which is indicated or activated to the PDSCH. In some scenarios, the PDSCH is transmitted from one TRP at one time such that (e.g., only) one TCI state can be indicated or activated for the PDSCH. In some embodiments, for the MAC CE, up to 8 codepoints can be activated for PDSCH, and each codepoint can contain up to 2 TCI states. Thus, the MAC CE can activate one codepoint that contains one TCI state or activate one TCI state for PDSCH, and the TCI state containing QCL type E may be activated or indicated. The QCL type E may include the QCL parameter {delay spread, average delay} or {average delay} or {delay spread} or {Doppler spread, delay spread, average delay}. In some embodiments, once the QCL type E is configured and activated by MAC CE or indicated by DCI, the Doppler shift related parameter are not contained in the TCI state (e.g., including only the QCL type E) and the UE cannot get the QCL information the Doppler shift parameter from (e.g., only) the TCI state.

In some embodiments, once the QCL type E is indicated or activated to the UE, the UE gets some of other QCL information. In some embodiments, the same reference signal can carry different QCL types. Thus, although different QCL types may be configured or activated or indicated, the UE can get more QCL information than the RRC configuration.

Figure 5:
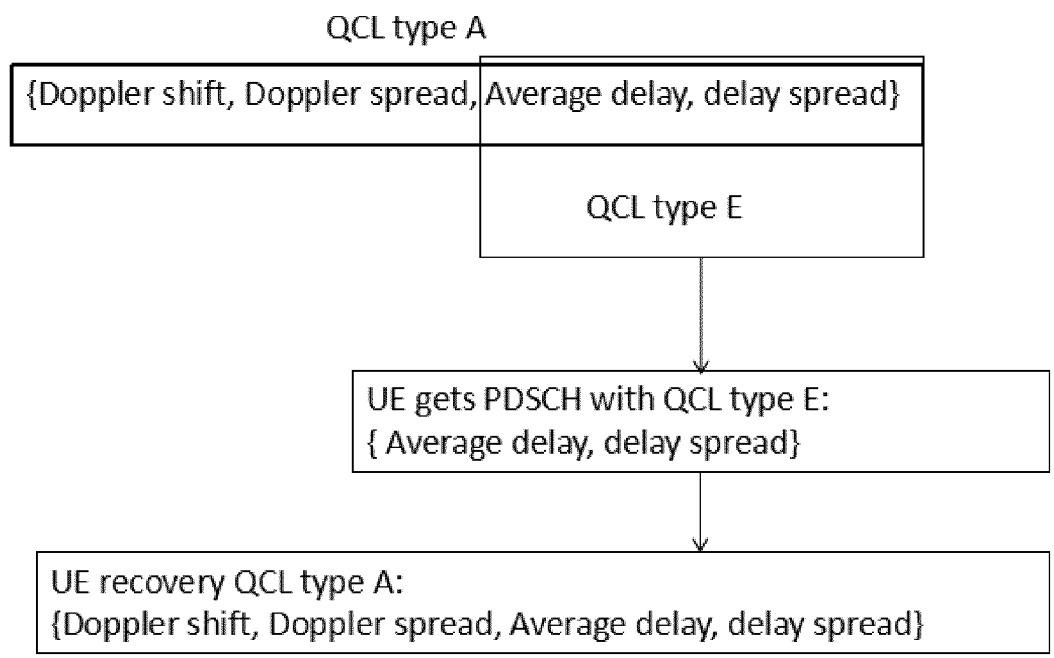
FIG. 5 illustrates an example diagram of treating one QCL type as another QCL type, in accordance with some embodiments of the present disclosure.

FIG. 5 illustrates an example diagram of treating one QCL type as another QCL type, in accordance with some embodiments of the present disclosure. Once the QCL type E is configured in one TCI state and this TCI state can be activated by the MAC CE and/or indicated by DCI signaling, the UE can get the QCL type E from the indicated or activated TCI states, and can recover (e.g., get/use from a previous reception) the other QCL information. Thus, once the QCL type E (information) is indicated or activated to one UE, the UE can treat the QCL type E as the QCL type A, as shown in FIG. 5.

In some embodiments, the QCL type E may contain one or more QCL parameters of QCL type A. Thus, once the MAC CE activates one TCI state or one codepoint containing one TCI state with the QCL type E (e.g., QCL type E information), and the DCI indicates the one TCI state for the PDSCH, the QCL type E can be treated as the QCL type A, the QCL type B, or the QCL type C.

Figure 6:
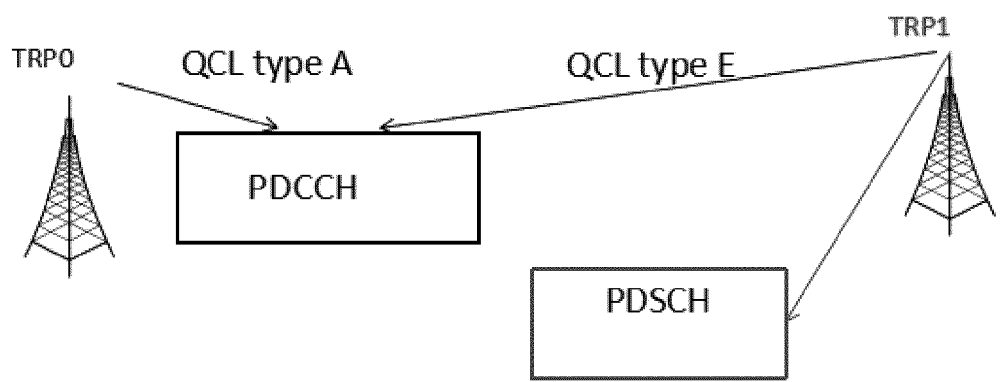
FIG. 6 illustrates an example block diagram of deriving a QCL type of a PDSCH from a QCL type of a PDCCH, in accordance with some embodiments of the present disclosure.

FIG. 6 illustrates an example block diagram of deriving a QCL type of a PDSCH from a QCL type of a PDCCH, in accordance with some embodiments of the present disclosure. In some embodiments, a time duration of the PDCCH and the scheduled PDSCH is less than a threshold, for a single TRP transmission. Thus, the TCI state of the PDSCH can be same as a lowest index of a control resource set (CORESET) in a latest slot (e.g., the TCI state is a default TCI state if the PDSCH is inside a window of the DCI indication). As shown in FIG. 6, the PDCCH is transmitted in the SFN manner. Thus, in some embodiments, each CORESET is associated with two TCI states activated by the MAC CE. In the SFN transmission, the QCL type A and the QCL type E may be configured for the PDCCH. If the PDSCH is configured as being transmitted from a single TRP, the QCL parameters of PDSCH can be derived/recovered/obtained from the QCL parameters of the QCL type A and the QCL type E of the PDCCH. As shown in FIG. 6, the PDSCH is transmitted from the TRP 1 and the QCL type E contains the delay related information, and the PDSCH is transmitted from the TRP 1. Thus, the PDSCH can obtain the delay related information from the TCI state with QCL type E.

In order to get accurate estimation of PDSCH, the Doppler related information can be indicated to UE, but the QCL type E (e.g., only) contains the delay related information, in some embodiments. Thus, the other QCL information can be obtained from the other TCI state activated for the same CORESET with the lowest index in the latest slot. In some embodiments, the QCL type A and the QCL type E may have the same QCL parameters. Thus, the default TCI state of the PDSCH can get/include/incorporate the QCL parameters from the QCL type of the TCI state of the same TRP, and get/include/incorporate the other parameters from the other TCI state. One or more of the QCL parameters {delay spread, average delay} of the PDSCH can obtained from the QCL type E of the activated TCI state for TRP1, and one or more of the QCL parameters {Doppler shift, Doppler spread} can be obtained from QCL type A of the activated TCI states. As shown in FIG. 6, once two TCI states are activated for the PDCCH and (e.g., only) one TCI state is indicated for the PDSCH, which one of the TCI states containing QCL type A or the combined QCL parameters can be used as the default QCL parameters can be indicated. If the QCL type of the indicated TCI state of PDSCH is the QCL type E, the default TCI state can be a TCI state containing the combined QCL parameters (e.g., include the QCL type A and the QCL type E) or the default TCI states can omit for the QCL type E (e.g., include the QCL type A).

Figure 7:
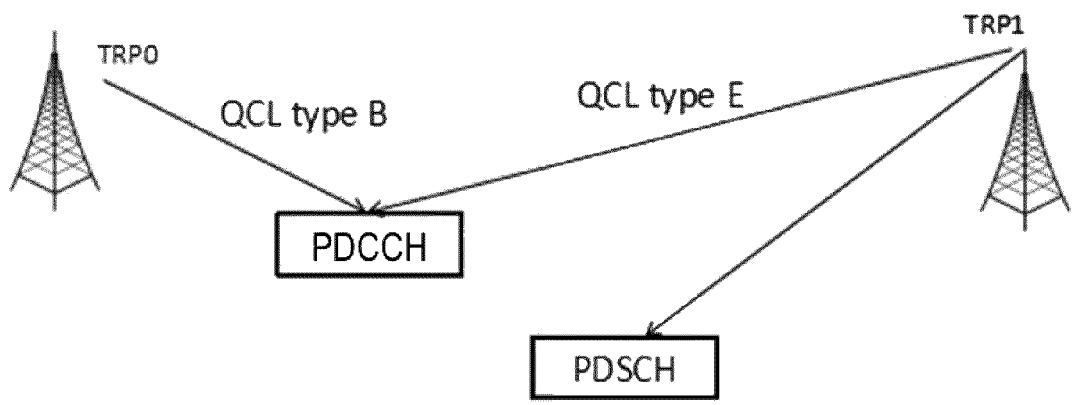
FIG. 7 illustrates another example block diagram of deriving a QCL type of a PDSCH from a QCL type of a PDCCH, in accordance with some embodiments of the present disclosure.

FIG. 7 illustrates another example block diagram of deriving a QCL type of a PDSCH from a QCL type of a PDCCH, in accordance with some embodiments of the present disclosure. In the case of the SFN-based PDCCH scheduling a single TRP-based PDSCH, as shown in FIG. 7, similarly to FIG. 6, the PDCCH is in the SFN manner and the PDSCH is transmitted from one TRP. In some embodiments, the TCI states for PDCCH activated by MAC CE contains the QCL type B and QCL type E, the QCL parameters {delay spread, average delay} are configured for QCL type E, and the QCL parameters {Doppler shift, Doppler spread} are configured for QCL type B. Thus, the QCL information of the default TCI state of PDSCH can be combined from the QCL parameters of the two TCI states of the lowest index CORESET in the latest slot.

As described above, once the PDSCH is activated or introduced with only one TCI state, the QCL type of the default TCI state can be treated as QCL type A.

For a single DCI-based MTRP transmission (e.g., multiple PDSCH transmissions), one codepoint may contain one or two TCI states, and a codepoint index can be used to indicate the TCI states of the PDSCH. Some embodiments include a threshold of a time duration of the DCI signaling and the scheduled PDSCH. In some embodiments, if the time duration is less than the threshold, the default TCI states is used as the TCI states of PDSCH. In some embodiments, for the single DCI-based MTRP transmission, the default TCI state of the PDSCH is the codepoint with the lowest index which was activated by MAC CE.

In some embodiments, the TCI states indicated for PDSCH contains two kinds of QCL types respectively. In some embodiments, two QCL type A are configured for the two TCI states of the activated and indicated codepoint, one or both of the TCI states are configured or indicated to ignore some parameters, and the actual configured QCL parameters are QCL type A. Thus, the UE can get any QCL parameter from each TCI state.

Figure 8:
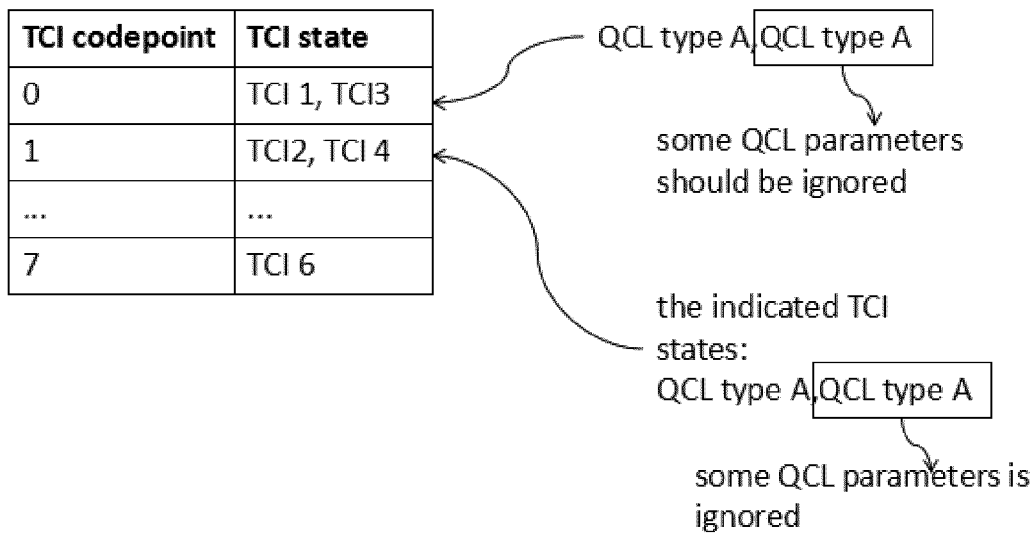
FIG. 8 illustrates an example diagram of determining whether to ignore some QCL parameters, in accordance with some embodiments of the present disclosure.

FIG. 8 illustrates an example diagram of determining whether to ignore some QCL parameters, in accordance with some embodiments of the present disclosure. For the single DCI-based Multi-TRP transmission, once SFN or pre-compensation is configured, the default TCI states of PDSCH can be indicated by the CDM group index (e.g., or the antenna port field in DCI) or in a default manner to ignore some of the configured QCL parameters, such as the ignore manner introduced in embodiment 1, as shown in FIG. 8. If the other TCI state of the indicated TCI states of the PDSCH is indicated or configured to ignore some QCL parameters, the relative default TCI states can be treated to ignore the same QCL parameters. Whether to ignore some QCL parameters of the default TCI state can be determined by the number of DMRS CDM groups. In some embodiments, the transmission scheme is configured as SFN or pre-compensation. In some embodiments, the DMRS CDM group number is only one, and the QCL parameters of one or both the default TCI states should be ignored. In some embodiments, once the CDM group number is indicated as two, the QCL parameters are not ignored because, in some embodiments, the TCI state is associated with different TCI states and all the QCL parameters is needed.

Figure 9:
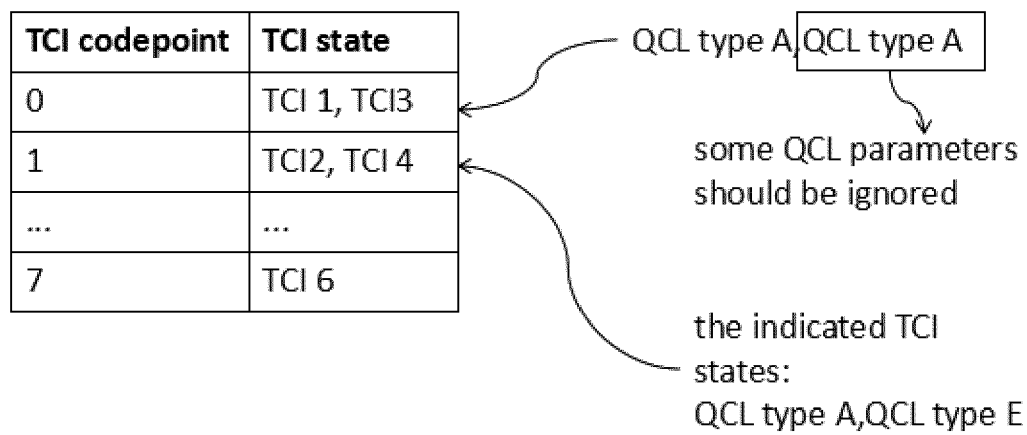
FIG. 9 illustrates another example diagram of determining whether to ignore some QCL parameters, in accordance with some embodiments of the present disclosure.

FIG. 9 illustrates another example diagram of determining whether to ignore some QCL parameters, in accordance with some embodiments of the present disclosure. In some embodiments, the PDSCH is indicated as QCL type A and QCL type E for the two TCI states, respectively, and the default TCI state of the codepoint with the lowest index activated by MAC CE (e.g., only) contains QCL type A. Thus, some QCL parameters in one of the default TCI states can be ignored. Accordingly, the QCL information can be ignored according to the TCI states of PUSCH indicated to the UE. For example, if the first TCI state of the indicated codepoint contains the QCL type A and the second TCI state of the indicated codepoint contains the QCL type E, the second TCI state of the default TCI state of the lowest codepoint in the MAC CE can ignore some QCL parameters, as shown in FIG. 9.

In some embodiments such as in the case of PDSCH transmission with spatial division multiplexing (SDM), e.g., two DMRS CDM groups are indicated to the UE for PDSCH, the indicated TCI state of the PDSCH contains the QCL type A, and the TCI state of the lowest index codepoint contains QCL type A and QCL type E. As described above, the QCL type E can be recovered as the QCL type A. In some embodiments, once the QCL type E is recovered as the QCL type A, there are enough QCL parameters for the PDSCH. Thus, in some embodiments, the default TCI states configured as QCL type A and QCL type E are recovered as QCL type A and QCL type A.

In some embodiments such as for the default TCI states of aperiodic CSI-RS, when the scheduling offset between the last symbol of the PDCCH carrying the triggering DCI and the first symbol of the aperiodic CSI-RS resources in a NZP-CSI-RS-ResourceSet (non-zero power CSI-RS Resource Set) configured without higher layer parameter trs-Info is smaller than the UE reported threshold beamSwitchTiming, when the reported value is one of the values of {14, 28, 48} and enableBeamSwitchTiming is not provided, or is smaller than 48 when the UE provides beamSwitchTiming-r16, enableBeamSwitchTiming is provided and the NZP-CSI-RS-ResourceSet is configured with the higher layer parameter repetition set to 'off' or configured without the higher layer parameter repetition, or is smaller than the UE reported threshold beamSwitchTiming-r16, when enableBeamSwitchTiming-r16 is provided and the NZP-CSI-RS-ResourceSet is configured with the higher layer parameter repetition set to 'on', the TCI state of aperiodic CSI-RS is the default TCI state. For the SFN-based transmission or SDM based transmission or FDM based transmission, the PDSCH of one symbol can be indicated with 2 TCI states, and may be different QCL types are configured for each TCI state. In some embodiments, the TCI states of aperiodic CSI-RS is supported as one, and the default TCI state is one of the TCI states of the other RS (e.g. PDSCH) in the same symbol.

There are a number of embodiments for deciding which one of the two TCI states of PDSCH can be used as the default TCI state of aperiodic CSI-RS. In some embodiments, the first of the two TCI states is used as the default TCI state. Thus, the QCL information of the first TCI state may be enough to receive or modulate the aperiodic CSI-RS. For the SFN-based PDSCH transmission, once the pre-compensation is configured or indicated, some of the QCL parameters may be ignored or new QCL types are configured. In some embodiments, the first TCI state is limited as the QCL type A (some QCL parameters may be ignored), or if the QCL type E is configured in the first TCI state, the QCL type E is recovered as the QCL type A.

In some embodiments, the TCI state that contains QCL type A is used as the default TCI state of aperiodic CSI-RS. In some embodiments, a new QCL type may contain the QCL parameters that are not enough to demodulate the aperiodic CSI-RS. Thus, if the new QCL type is configured and indicated to the PDSCH, the TCI state that contains QCL type A can be used as the default TCI state.

In some embodiments such as in the case where there are no other RS in a same symbol of the aperiodic CSI-RS (e.g., for one codepoint that is mapped to two TCI states, two different values of coresetPoolIndex are configured, or just one TCI state is contained in one codeword or the PDCCH), once the QCL type E is used as the default TCI state, the TCI state corresponding to the lowest CORESET index can be used, and the QCL type E can be recovers as QCL type A or B or C.

In some embodiments such as in the case where there are no other RS in a same symbol of the aperiodic CSI-RS (e.g., for one codepoint that is mapped to two TCI states, two different values of coresetPoolIndex are configured, or just one TCI state is contained in one codeword or the PDCCH), the combined QCL information can be used as the second set of QCL information which used for the Aperiodic CSI-RS reception, the combined QCL information means some of the second QCL information comes from the first set of QCL information contained in one TCI state and some other of the second QCL information comes from the first set of QCL information contained in other TCI states.

Similarly, if PDSCH is in the symbol of the aperiodic CSI-RS, the second set of QCL information of the default TCI states of aperiodic CSI-RS of combined QCL information can be used as the second set of QCL information which used for the Aperiodic CSI-RS reception, the combined QCL information means some of the second QCL information comes from the first set of QCL information contained in one TCI state and some other of the second QCL information comes from the first set of QCL information contained in other TCI states.

In some embodiments such as in a case of PDCCH with 2 TCI states and the PDSCH with single TCI state, for the default beam of PDSCH when the time duration is smaller than a threshold, the TCI state configured as QCL type A is used as the default beam of the PDSCH.

In some embodiments such as in the case of the higher layer parameter configures two different values of CORESETPoolIndex and the lowest index CORESET in the latest slot contains two TCI states, one of the TCI states is used as the default TCI state of the scheduling PDSCH.

In some embodiments, the first of the two TCI states is used as the default TCI of the scheduling PDSCH. If QCL type B, QCL type C, QCL type E is configured in the first TCI state, the QCL type can be recovered as QCL type A. In some embodiments, The TCI state configured as QCL type A is applied as the default TCI state of the scheduling PDSCH.

In some embodiments, if the PDSCH is scheduled by a DCI format not having the TCI field present, and the time offset between the reception of the downlink (DL) DCI and the corresponding PDSCH of a serving cell is equal to or greater than a threshold timeDurationForQCL if applicable, wherein the threshold is based on a reported UE capability, for determining a PDSCH antenna port QCL, the UE assumes/determines that the TCI state or the QCL assumption for the PDSCH is identical to the TCI state or QCL assumption which is applied for the CORESET that is used for the PDCCH transmission within an active bandwidth part (BWP) of the serving cell. In some embodiments, if the CORESET that is used for the PDSCH transmission contains the QCL type E, the QCL type E is recovered as the QCL type A, the QCL type B, or the QCL type C.

In some embodiments, a QCL type D is configured with the QCL type A, the QCL type B, the QCL type C, or the QCL type E, the QCL type D is reserved. For example, if the QCL type E+QCL type D is configured and received as the first set of QCL information and the QCL type E can be recovered as QCL type A, the QCL type A+QCL type D are the applied second set of QCL information.

In some embodiments, if the QCL type E is not configured and partial parameters from the QCL type A, the QCL type B, or the QCL type C is ignored for the second set of QCL information (e.g., the UE applies the second QCL information for PDCCH, PDSCH, or the aperiodic CSI-RS), the ignored parameters are recovered. For example, if the first set of QCL information like QCL type A from the activated TCI states or indicated or the default TCI states is indicated as ignored some parameters, the UE can use the second set of QCL information based on the first set of QCL information as recovering the ignored QCL parameters or the UE may not ignore the QCL parameters.

In some embodiments, for the MTRP PDSCH transmissions, once the PDSCH are transmitted from different TRPs and scheduled by different DCI, the scrambling ID of the PDSCH is associated with the CORESETPoolIndex. For Multi-DCI based Multi-TRP transmission, the PDSCH scheduled by different DCI can be associated with different CORESETPoolIndex values. However, in some embodiments, for PDCCH repetition, the DCI from different TRPs schedules the same PDSCH, the different DCI repetition with different CORESETPoolIndex values are associated with the same PDSCH, and one of the CORESETPoolIndex values are associated with the scrambling ID of the PDSCH.

In some embodiments, one association of the scrambling ID and the CORESETPoolIndex is pre-defined (e.g., default) or configured, e.g., the CORESET Pool with a lower index or the CORESET Pool with the lowest CORESET ID. In some embodiments, the association is according to the PDCCH transmission time, e.g., the scrambling ID of PDSCH is associated with the CORESETPoolIndex of the latest transmitted PDCCH. If the CORESETPoolIndex is the same for the PDCCH repetition, the scrambling ID of the PDSCH can be associated with the CORESETPoolIndex.

One bit in a DCI field can indicate the scrambling ID of the PDSCH. The one bit in DCI can be used to indicate the PDSCH scrambling ID 1 or PDSCH scrambling ID 2, and the two scrambling IDs can be associated with the two CORESET pools. For example, value 0 in the DCI field can indicate the PDSCH scrambling ID 1, and value 1 in the DCI field can indicate the PDSCH scrambling ID 2.

A TCI state index can be used to indicate the CORESETPoolIndex values associated with the PDSCH. All the configured or activated TCI states can be divided into two groups, and each group can be associated with one scrambling ID and one CORESETPoolIndex. For example, if 64 TCI states are configured for the PDSCH, the 64 TCI states are divided to two groups, such as TCI state 0-31 and TCI state 32-63, the DCI repetition indicates one TCI state for the PDSCH in this DCI field, and the indicated TCI state in DCI field is one from TCI state 0-31, the PDSCH is indicated to be transmitted from TRP0 and associated with CORESET Pool 0; but if the indicated TCI state in the DCI field is one from TCI state 32-63, the PDSCH is indicated to be transmitted from TRP1 and associated with CORESET Pool 1.

Similarly, in some embodiments, the DCI repetitions associate with different CORESETs or CORESET Pool index values, different DCI repetitions are transmitted from different TRPs, and the different DCI repetition schedule one PDSCH. Thus, in some embodiments, rate matching of this PDSCH knows/determines which one of the two rate matching parameters is chosen.

In some embodiments, one association of the CRS pattern and the CORESETPoolIndex is pre-defined or configured, e.g. the CORESET Pool with a lower index or the CORESET Pool with the lowest CORESET ID. In some embodiments, the association is according to the PDCCH transmission time, e.g., the CRS pattern of the PDSCH associated with the CORESETPoolIndex of the latest PDCCH. If the CORESETPoolIndex is same for the PDCCH repetition, the CRS pattern of the PDSCH can be associated with the CORESETPoolIndex.

If the CRS pattern is not configured per CORESET Pool, e.g., crs-RateMatch-PerCoresetPoolIndex is disabled, then both of the CRS patterns can be used to do the rate matching of PDSCH. One bit in a DCI field can indicate the CRS pattern of the PDSCH. This one bit in the DCI can be used to indicate the PDSCH lte-CRS-PatternList1-r16 or lte-CRS-PatternList2-r16, and these 2 CRS pattern can be associated with the two CORESET pools. For example, value 0 in the DCI field indicates the PDSCH lte-CRS-PatternList1-r16, and value 1 in the DCI field indicates the PDSCH lte-CRS-PatternList2-r16.

The TCI state index can be used to indicate the CORESETPoolIndex associated with the PDSCH. All the configured or activated TCI states can be divided to two groups, and each group associated with one CRS pattern and one CORESETPoolIndex. For example, if 64 TCI states are configured for the PDSCH, and these 64 TCI states are divided to two groups, such as TCI state 0-31 and TCI state 32-63, the DCI repetition can (e.g., only) indicate one TCI state for the PDSCH in this DCI field, the indicated TCI state in DCI field is one from TCI state 0-31, the PDSCH is indicated to be transmitted from TRP0 and associated with CORESET Pool 0; but, if the indicated TCI state in DCI field is one from TCI state 32-63, the PDSCH is indicated to be transmitted from TRP1 and associated with CORESET Pool 1.

Figure 10:
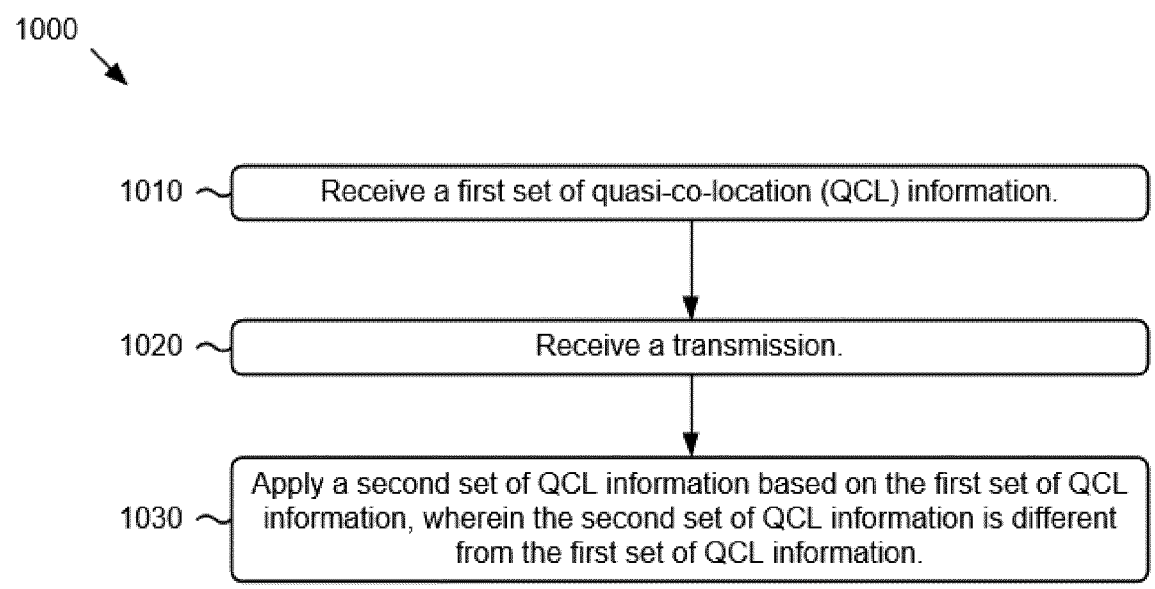
FIG. 10 illustrates a flowchart diagram of a method for determining SFN using QCL information, in accordance with some embodiments of the present disclosure.

FIG. 10 illustrates a flowchart diagram of a method 1000 for determining SFN using QCL information, in accordance with some embodiments of the present disclosure. Referring to FIGS. 1-9, the method 1000 can be performed by a wireless communication device (e.g., a UE), in some embodiments. Additional, fewer, or different operations may be performed in the method 1000 depending on the embodiment.

In brief overview, in some embodiments, a wireless communication device receives a first set of quasi-co-location (QCL) information (operation 1010). In some embodiments, the wireless communication device receives a transmission (operation 1020). In some embodiments, the wireless communication device applies a second set of QCL information based on the first set of QCL information (operation 1030). In some embodiments, the second set of QCL information is different from the first set of QCL information.

In more detail, at operation 1010, in some embodiments, the wireless communication device receives the first set of QCL information. In some embodiments, the first set of QCL information is received from a BS (e.g., a base station, the BS 102, the BS 202, a gNB, an eNB, a wireless communication node, etc.) or a TN (e.g., a tower, an antenna array). In some embodiments, the first set of QCL information is contained in the received TCI states. The first set of QCL information can include one or more of QCL type A information of a first transmission configuration indicator (TCI) state, and QCL type A information of a second TCI state.

In some embodiments, the wireless communication device receives, from the wireless communication node, a medium access control control element (MAC CE) transmission to activate at least one TCI state that includes the first set of QCL information, the at least one TCI state including QCL type E information or the QCL information contained in at least one TCI state ignores some QCL information having part of QCL type A information, wherein the transmission includes a physical downlink control channel (PDCCH) transmission. In some embodiments, the wireless communication device receives, from the wireless communication node, a downlink control information (DCI) transmission to indicate at least one TCI state that includes the first set of QCL information, the at least one TCI state including QCL type E information or the QCL information contained in at least one TCI state ignores some QCL information having part of QCL type A information for the transmission that includes a physical downlink shared channel (PDSCH) transmission.

In some embodiments, the wireless communication device receives, from the wireless communication node, a signaling that includes an indication of a codepoint that includes two TCI states of the first set of QCL information, one of the two TCI states having part of QCL type A information At operation 1020, in some embodiments, the wireless communication device receives the transmission. In some embodiments, the transmission is received from the BS or the TRP. In some embodiments, the transmission is received according to the first set of QCL parameters. In some embodiments, the transmission includes a PDCCH transmission, a PDSCH transmission, or an aperiodic CSI-RSI transmission.

In some embodiments, a default TCI state configured for the transmission includes QCL type E information; the transmission includes physical downlink control channel (PDCCH) transmission that includes two TCI states having the first set of QCL information (e.g., certain QCL parameters); and the at least one downlink channel transmission includes a physical downlink shared channel (PDSCH) transmission that indicates a single TCI state with the first set of QCL information, wherein default TCI state is the TCI state of a control resource set (CORESET) with a lowest index in a latest slot when an offset between reception of the DCI transmission and the PDSCH transmission is less than a threshold which is configured by higher layer signaling.

In some embodiments, the at least one TCI state is a single TCI state including the first set of QCL information having QCL type E information is activated for the PDCCH transmission.

In some embodiments, the at least one TCI state is a single TCI state including the first set of QCL information having QCL type E is indicated for the PDSCH transmission;

In some embodiments, a default TCI state configured for the transmission includes QCL type E information; at least one TCI state of the first QCL information indicated for the PDSCH transmission is of QCL type E; and the transmission includes an aperiodic (AP) channel state information reference signal (CSI-RS) transmission, wherein the default TCI state is the TCI state of the PDSCH transmission on a same symbol with the aperiodic CSI-RS when a scheduling offset between a last symbol of a PDCCH transmission carrying the DCI transmission and a first symbol of the aperiodic CSI-RS resources configured without higher layer parameter trs-Info is smaller than the wireless communication device's reported threshold beamSwitchTiming.

In some embodiments, a default TCI state configured for the transmission includes QCL type E information; at least one TCI state of the first QCL information activated for the PDCCH transmission is of QCL type E; and the transmission includes an aperiodic channel state information reference signal (CSI-RS) transmission, wherein the default TCI state is a TCI state of a control resource set (CORESET) with a lowest index in a latest slot with the aperiodic CSI-RS transmission when there is no other reference signal (RS) on the symbol with the aperiodic CSI-RS.

In some embodiments, a default TCI state configured for the transmission includes QCL type E information; the transmission comprises an aperiodic channel state information reference signal (CSI-RS) transmission, wherein the default TCI state is a TCI state of a codepoint with a lowest index with two TCI state activated by MAC-CE when there is no other reference signal (RS) on the symbol with the aperiodic CSI-RS In some embodiments, at least one TCI state of the first set of QCL information includes QCL type E information; and two demodulation reference signal (DMRS) code division multiplexing (CDM) groups are indicated for the PDSCH transmission.

In some embodiments, a default TCI state includes QCL type E information; and two demodulation reference signal (DMRS) code division multiplexing (CDM) groups are indicated for the PDSCH transmission, wherein the default TCI states are the TCI states of the first set of QCL information with the lowest codepoint index containing two TCI states activated by medium access control control element (MAC CE) when the offset between the reception of the DCI transmission and the PDSCH transmission is less than a threshold which is configured by higher layer parameter.

In some embodiments, a higher layer parameter configures two different values of CORESETPoolIndex of a higher layer, and a lowest index CORESET in a latest slot contains two TCI states; one TCI state from each CORESET pool is be used as the second set of QCL information to be applied to the PDSCH reception; and at least one of the TCI state from each CORESET pool used for the PDSCH reception includes QCL type E information.

In some embodiments, a higher layer parameter is used to configure pre-compensation on the PDSCH transmission.

In some embodiments, the QCL information of the PDCCH transmission which scheduled the PDSCH includes QCL type E information, wherein a physical downlink shared channel (PDSCH) transmission is scheduled by a downlink control information (DCI) format not having a TCI field present, and a time offset between reception of the DCI transmission and the PDSCH transmission of a serving cell is equal to or greater than a threshold timeDurationForQCL.

In some embodiments, the transmission includes an aperiodic channel state information reference signal (CSI-RS) transmission, and a TCI state of the first set of QCL information including QCL type A information is applied as a default TCI state for the aperiodic CSI-RS transmission, wherein the first set of QCL information is in TCI states of a physical downlink shared channel (PDSCH) transmission with a same symbol of the aperiodic CSI-RS transmission or a control resource set (CORESET) with a lowest index in a latest slot.

In some embodiments, the transmission includes a physical downlink shared channel (PDSCH) transmission, and a TCI state of the first set of QCL information including QCL type A information is applied as a default TCI state for the PDSCH transmission with a single TCI state indicated, wherein this first set of QCL information is in TCI states of a control resource set (CORESET) with a lowest index in a latest slot or a CORESET used for a scheduling physical downlink control channel (PDCCH) transmission.

At operation 1030, in some embodiments, the wireless communication device applies the second set of QCL information based on the first set of QCL information, wherein the second set of QCL information is different from the first set of QCL information. For example, the UE the wireless communication device receives the first set of QCL information as QCL type A+QC type E, and applies QCL type A+QCL type A as the second set of QCL information. In some embodiments, the second set of QCL information is applied on another transmission (e.g., a PDSCH). In some embodiments, the second set of QCL information includes partial parameters of QCL type A of the first TCI state, and partial parameters of QCL type A of the second TCI state. In some embodiments, the second set of QCL information includes parameters of {delay spread} of the first TCI state, and parameters of {Doppler shift, Doppler spread, average delay,} of the second TCI state. In some embodiments, the second set of QCL information includes parameters of {delay spread, average delay} of the first TCI state, and parameters of {Doppler spread, Doppler shift} of the second TCI state.

In some embodiments, the wireless communication device determines, according to at least one of: an antenna port field or a demodulation reference signal (DMRS) code division multiplexing (CDM) group index of downlink control information (DCI), that the first TCI state of the second set of QCL information includes parameters {delay spread, average delay}, and that the second TCI state of the second set of QCL information include parameters {Doppler shift, Doppler spread}. In some embodiments, the second set of QCL information include parameter {Doppler shift} of the first TCI state, and parameters {Doppler spread, average delay, delay spread} of the second TCI state.

In some embodiments, the wireless communication device applies the second QCL information based on the first set of QCL information having QCL type E information from at least one downlink channel transmission, as if the first set of QCL information has QCL type A, B or C information. In some embodiments, the wireless communication device applies the second QCL information of the second set of QCL information having QCL type A, B or C information based on the first set of QCL information including the QCL type E information, on at least one downlink channel transmission, as if the first set of QCL information has QCL type A, B or C information.

In some embodiments, the wireless communication device applies the second set of QCL information by ignoring at least one QCL parameter of the first set of QCL information, wherein the first set of QCL information is contained in a codepoint with a lowest index having two TCI states activated by medium access control control element (MAC CE) signaling. That is, in some embodiments, the one of the two TCI states having part of QCL type A information is of QCL type E.

In some embodiments, the wireless communication device determines, according to at least one of: an antenna port field or a demodulation reference signal (DMRS) code division multiplexing (CDM) group index of downlink control information (DCI), that the QCL information should be ignored in which of the two TCI states.

In some embodiments, the second set of QCL information is combined from the first set of QCL information, wherein the only one TCI state contains the second set of QCL information, and at least two TCI states contains the first set of QCL information.

In some embodiments, the transmission comprises a physical downlink shared channel (PDSCH) transmission, and wherein this first set of QCL information is in TCI states of a control resource set (CORESET) with a lowest index in a latest slot or a CORESET used for a scheduling physical downlink control channel (PDCCH) transmission.

In some embodiments, the transmission comprises an aperiodic CSI-RS transmission, and wherein this first set of QCL information is in TCI states of a control resource set (CORESET) with a lowest index in a latest slot or a CORESET used for a scheduling physical downlink control channel (PDCCH) transmission when there is no other reference signal in the same symbol with aperiodic CSI-RS transmission.

In some embodiments, the transmission comprises a aperiodic CSI-RS transmission, and wherein this first set of QCL information is in TCI states of the PDSCH transmission on a same symbol with the aperiodic CSI-RS when a scheduling offset between a last symbol of a PDCCH transmission carrying the DCI transmission and a first symbol of the aperiodic CSI-RS resources configured without higher layer parameter trs-Info is smaller than the wireless communication device's reported threshold beamSwitchTiming.

In some embodiments, a non-transitory computer readable medium stores instructions, which when executed by at least one processor, cause the at least one processor to perform any of the methods described above. In some embodiments, an apparatus includes at least one processor configured to implement any of the methods described above.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:
receiving, by a wireless communication device, a first set of quasi-co-location (QCL) information;
receiving, by the wireless communication device from a wireless communication node, a transmission and a signaling that includes an indication of a codepoint that includes two transmission configuration indicator (TCI) states of the first set of QCL information, at least one TCI state including QCL type E information or QCL information contained in the at least one TCI state having part of QCL type A information; and
applying, by the wireless communication device, a second set of QCL information based on the first set of QCL information, wherein the second set of QCL information is different from the first set of QCL information, wherein the second set of QCL information is based on the first set of QCL information having the QCL type E information from at least one downlink channel transmission, as if the first set of QCL information has QCL type A, B or C information, and
wherein the transmission comprises a physical downlink shared channel (PDSCH) transmission or a physical downlink control channel (PDCCH) transmission.

2. The method of claim 1, wherein:
the first set of QCL information comprises QCL type A information of a first TCI state, and QCL type A information of a second TCI state, and
the second set of QCL information includes partial parameters of QCL type A of the first TCI state, and partial parameters of QCL type A of the second TCI state.

3. The method of claim 2, wherein the second set of QCL information includes parameters of {delay spread} of the first TCI state, and parameters of {Doppler shift, Doppler spread, average delay,} of the second TCI state.

4. The method of claim 2, wherein the second set of QCL information includes parameters of {delay spread, average delay} of the first TCI state, and parameters of {Doppler spread, Doppler shift} of the second TCI state.

5. The method of claim 2, comprising:
determining, by the wireless communication device, according to at least one of: an antenna port field or a demodulation reference signal (DMRS) code division multiplexing (CDM) group index of downlink control information (DCI), that the first TCI state of the second set of QCL information includes parameters {delay spread, average delay}, and that the second TCI state of the second set of QCL information include parameters {Doppler shift, Doppler spread}.

6. The method of claim 1, comprising:
receiving, by the wireless communication device from the wireless communication node, a medium access control control element (MAC CE) transmission to activate the at least one TCI state that includes the first set of QCL information, the at least one TCI state including the QCL type E information or the QCL information contained in the at least one TCI state ignores some QCL information having part of the QCL type A information; and applying, by the wireless communication device, second QCL information based on the first set of QCL information having the QCL type E information from the at least one downlink channel transmission, as if the first set of QCL information has the QCL type A, B or C information.

7. The method of claim 1, comprising:

receiving, by the wireless communication device from the wireless communication node, a downlink control information (DCI) transmission to indicate at least one TCI state that includes the first set of QCL information, the at least one TCI state including the QCL type E information or the QCL information contained in the at least one TCI state ignores some QCL information having part of the QCL type A information for the transmission that comprises the PDSCH transmission; and applying, by the wireless communication device, second QCL information of the second set of QCL information having QCL type A, B or C information based on the first set of QCL information including the QCL type E information, on the at least one downlink channel transmission, as if the first set of QCL information has the QCL type A, B or C information.

8. The method of claim 6, wherein:

a default TCI state configured for the transmission includes the QCL type E information;

the transmission comprises the PDCCH transmission that includes two TCI states having the first set of QCL information; and the at least one downlink channel transmission comprises the PDSCH transmission that indicates a single TCI state with the first set of QCL information, wherein the default TCI state is the TCI state of a control resource set (CORESET) with a lowest index in a latest slot when an offset between reception of a DCI transmission and the PDSCH transmission is less than a threshold which is configured by higher layer signaling.

9. The method of claim 6, wherein:

the at least one TCI state is a single TCI state including the first set of QCL information having the QCL type E information is activated for the PDCCH transmission.

10. The method of claim 7, wherein:

the at least one TCI state is a single TCI state including the first set of QCL information having QCL type E is indicated for the PDSCH transmission.

11. The method of claim 7, wherein:

a default TCI state configured for the transmission includes the QCL type E information;

at least one TCI state of the first set of QCL information indicated for the PDSCH transmission is of QCL type E; and the transmission comprises an aperiodic channel state information reference signal (CSI-RS) transmission, wherein the default TCI state is the TCI state of the PDSCH transmission on a same symbol with the aperiodic CSI-RS transmission when a scheduling offset between a last symbol of the PDCCH transmission carrying the DCI transmission and a first symbol of the aperiodic CSI-RS transmission configured without higher layer parameter trs-Info is smaller than a reported threshold beamSwitchTiming of the wireless communication device.

12. The method of claim 6, wherein:

a default TCI state configured for the transmission includes the QCL type E information;

at least one TCI state of the first set of QCL information activated for the PDCCH transmission is of QCL type E; and the transmission comprises an aperiodic channel state information reference signal (CSI-RS) transmission, wherein the default TCI state is a TCI state of a control resource set (CORESET) with a lowest index in a latest slot with the aperiodic CSI-RS transmission when there is no other reference signal (RS) on a symbol with the aperiodic CSI-RS transmission.

13. The method of claim 1, wherein:

a default TCI state configured for the transmission includes the QCL type E information;

the transmission comprises an aperiodic channel state information reference signal (CSI-RS) transmission, wherein the default TCI state is a TCI state of a codepoint with a lowest index with two TCI state activated by MAC-CE when there is no other reference signal (RS) on a symbol with the aperiodic CSI-RS transmission.

14. The method of claim 7, wherein:

the at least one TCI state of the first set of QCL information includes the QCL type E information; and two demodulation reference signal (DMRS) code division multiplexing (CDM) groups are indicated for the PDSCH transmission.

15. The method of claim 7, wherein:

a default TCI state includes the QCL type E information; and two demodulation reference signal (DMRS) code division multiplexing (CDM) groups are indicated for the PDSCH transmission, wherein the default TCI states are the TCI states of the first set of QCL information with a lowest codepoint index containing two TCI states activated by MAC CE when an offset between reception of the DCI transmission and the PDSCH transmission is less than a threshold which is configured by higher layer parameter.

16. The method of claim 6, wherein:

a higher layer parameter configures two different values of CORESETPoolIndex of a higher layer, and a lowest index CORESET in a latest slot contains two TCI states;

one TCI state from each CORESET pool is be used as the second set of QCL information to be applied to PDSCH reception; and at least one of the TCI state from each CORESET pool used for the PDSCH reception includes the QCL type E information.

17. The method of claim 16, wherein:

a higher layer parameter is used to configure pre-compensation on the PDSCH transmission.

18. The method of claim 6, wherein:

the QCL information of the PDCCH transmission which scheduled the PDSCH includes the QCL type E information, wherein the PDSCH transmission is scheduled by a downlink control information (DCI) format not having a TCI field present, and a time offset between reception of the DCI transmission and the PDSCH transmission of a serving cell is equal to or greater than a threshold time DurationForQCL.

19. A wireless communication device, comprising:
at least one processor configured to:
- receive, via a receiver, a first set of quasi-co-location (QCL) information;
- receive, via the receiver from a wireless communication node, a transmission and a signaling that includes an indication of a codepoint that includes two TCI states of the first set of QCL information, at least one TCI state including QCL type E information or QCL information contained in the at least one TCI state having part of QCL type A information; and
- apply a second set of QCL information based on the first set of QCL information, wherein the second set of QCL information is different from the first set of QCL information, wherein the second set of QCL information is based on the first set of QCL information having the QCL type E information from at least one downlink channel transmission, as if the first set of QCL information has QCL type A, B or C information, and
- wherein the transmission comprises a physical downlink shared channel PDSCH) transmission or a physical downlink control channel (PDCCH) transmission.

* * * * *